Aug. 16, 1955  A. R. FLECK  2,715,547
MULTIPLE SPRAY WATER NOZZLE
Filed Dec. 9, 1952

INVENTOR
AUGUST R. FLECK
BY Francis J. Klenpay
ATTORNEY

United States Patent Office 2,715,547
Patented Aug. 16, 1955

2,715,547

MULTIPLE SPRAY WATER NOZZLE

August R. Fleck, Franklin, Pa.

Application December 9, 1952, Serial No. 324,889

1 Claim. (Cl. 299—121)

The present invention relates to nozzle attachments for garden hoses and the like, and more particularly to an improved nozzle device for effecting the simultaneous spraying or watering of a plurality of rows of plants or flowers, for example, and to certain specific improvements in watering nozzles whereby the same are rendered more suitable for application in greenhouse and gardening industries.

As a primary object this invention seeks to provide a watering or spraying nozzle of simple and practical design which is operative to effect the simultaneous watering of a plurality of rows of plants.

Another object of the invention is the provision of a watering nozzle for spraying a plurality of rows of plants or flowers which is small and compact and easily handled when in use and stored when not in use.

Yet another object of the invention resides in the provision of an improved watering nozzle which is characterized by its ability to water plants or the like thoroughly and at a relatively high rate of speed but with a minimum tendency to wash out soil about the roots of the plants and/or damage the foliage of delicate plants.

More specifically, the above object resides in the provision of a watering nozzle of the general type described which includes certain structural improvements for effecting proper dispersion of water over the area or areas to be sprayed in a vertical or substantially vertical direction whereby there is a minimum tendency for the soil to be displaced by the water.

Yet another object of the invention is the provision in a nozzle device for spraying a plurality of rows of plants of means in the nozzle for properly distributing the flow of water therethrough whereby each of the plurality of rows is provided with an equal or substantially equal quantity of water notwithstanding that some of the rows may be at a greater distance from the nozzle than others.

A further object of the invention resides in the provision of a nozzle device having the qualities and characteristics set forth above which is further characterized by its ability to function in the manner intended under low and high water pressures alike and where such water pressure may vary from time to time.

The above and other objects and advantages of the invention will become apparent upon full consideration of the following detailed specification and accompanying drawing wherein is disclosed a certain preferred embodiment of my invention.

Figure 1:
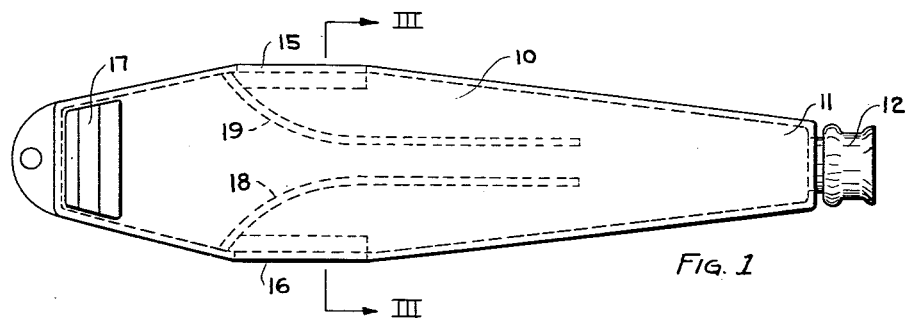
Figure 1 is a top plan view of a watering nozzle attachment constructed in accordance with the teachings of my invention.
Figure 2:
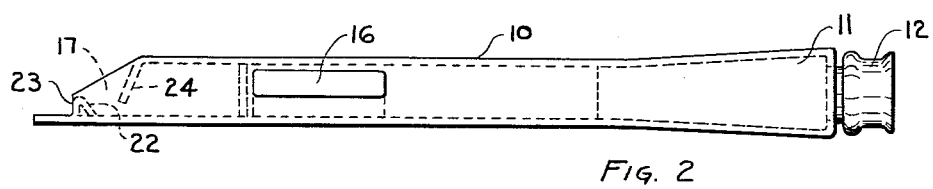
Figure 2 is a side elevation of the nozzle attachment of Figure 1.
Figure 3:
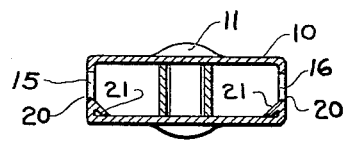
Figure 3 is a section view taken along line III—III of Figure 1.
Figure 4:
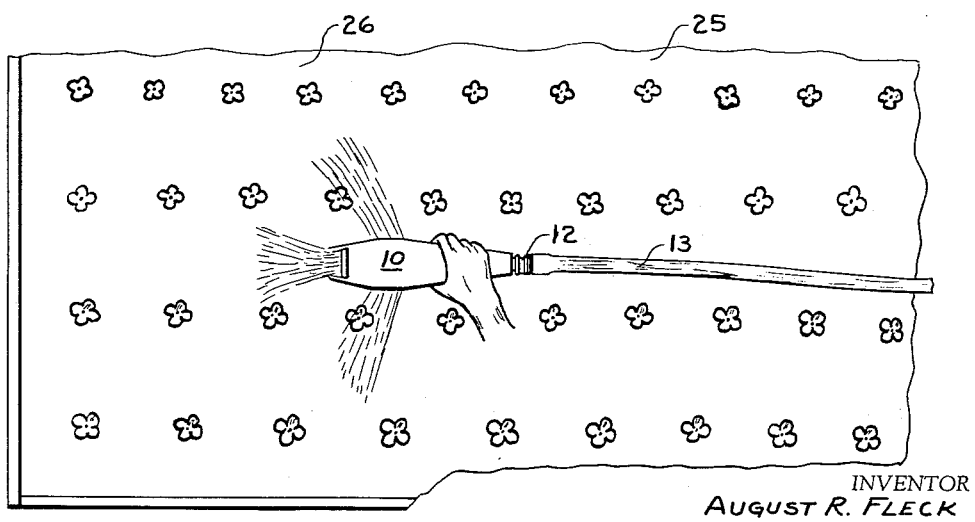
Figure 4 is a fragmentary view of a common commercial plant bed having a plurality of rows of plants, the view showing a preferred method of utilizing the apparatus of Figure 1 for effecting the simultaneous watering of a plurality of plant rows of the bed.

Referring now to the drawing it will be observed that my nozzle attachment comprises an elongated tubular body member 10 of generally flat rectangular cross section which is preferably of such dimensions as to be readily gripped in one hand in the manner illustrated in Figure 4. As shown in Figure 1, the body member 10 has a relatively wide center portion intermediate tapering end portions. At one end 11 the body member 10 is provided with a conventional female hose coupling 12 which is adapted for connection with a garden hose 13 or similar conduit whereby water may be supplied to the nozzle device in the manner desired.

In accordance with the teachings of the invention the body member 10 is provided along opposite side walls and at one end 14 with horizontally elongated outlet openings 15—17, respectively, which are adapted to discharge fan-like streams of water from the nozzle attachment in opposite lateral directions and in a forward direction as indicated in Figure 4. Also in accordance with the teachings of the invention the body 10 is provided internally with a pair of channel-forming members 18 and 19 which divide the tubular body 10 into three separate channels, each one of which is arranged to direct a stream of water toward one of the outlet openings 15—17.

The positioning of the channel-forming members 18 and 19 has been found to be an important consideration in the construction of my nozzle attachment in that the flow of water out of the forwardly positioned outlet opening 17 tends to be greater than that out of the side openings 15 and 16 due principally to the fact that there is less resistance to the water flowing straight through the body 10 than to that which must be directed laterally out of the openings 15 and 16. Accordingly I provide that the entrance of the center one of the three channels formed by the members 18 and 19 is somewhat smaller in cross section than the entrances to the outer channels so that there is substantial equality in resistance to flow in each of the three channels. A substantially equal volume flow of water through each of the three outlet openings is afforded by this arrangement.

Preferably the aggregate area of the openings 15—17 is such that the plurality thereof comprise a relatively restricted outlet as compared to the normal flow capacity of the hose 13 and water source, not shown. Thus, even where the water supply may be subject to time-to-time pressure variation any nozzle attachment will continue to function properly since the fan-like streams will be properly defined and controlled by the openings 15—17 unless the water pressure becomes so low that the openings no longer tend to materially restrict the flow of water through the nozzle.

In order to obtain the desired watering effect while providing for a maximum speed of operation I have found that it is advantageous to direct water outwardly of the openings 15—17 at an upward inclination whereby the issuing streams will be caused to travel through a substantially arched trajectory and will thereby be caused to strike the soil being watered at a vertical or substantially vertical angle, rather than at a sharply acute angle. This arrangement is highly advantageous in that there is little if any tendency for the water streams, even though they may issue at substantial velocity, to wash loose soil from around plant roots. Similarly there is little if any opportunity for delicate plants to become damaged or broken by the force of water striking the plants while moving with appreciable force in a lateral direction.

In the illustrated embodiment of my invention I provide for directing the water streams upwardly by providing, in the instance of the lateral openings 15 and 16, large upwardly extending lips 20, the upper edges of which define the lower edges of the openings 15 and 16. In accordance with the preferred teachings of the invention each lip 20 is integrally connected with an apron or deflector 21 which extends angularly from the upper edge of the lip to the bottom wall of the body member 10 whereby to direct the flow of water upwardly and to impart an upward inclination to the stream of water as it issues from the nozzle attachment. The deflectors 21 are preferably formed in the nozzle by bending downwardly the tab-like section of material which is cut about the openings 15 and 16.

Outlet opening 17, at the forward end of the nozzle attachment, is similarly provided with a deflector 22 which is integrally attached to an upwardly extending lip 23 whereby water flowing out the opening will be directed upwardly and thereby caused to descend vertically upon the area being watered. Preferably the opening 17 is somewhat smaller than openings 15 and 16, and in the present embodiment of the invention this is accomplished by defining the opening 17 at its lower edge by the bottom wall of the tubular body member 10 and at its upper edge by a downwardly depending lip 24.

The operation of my device is illustrated in Figure 4 wherein is shown a conventional commercial plant bed 25 comprised of a plurality of rows 26 of plants, the rows being evenly spaced in accordance with usual practice. The nozzle 10, which is in communication with a suitable source of water, not shown, by means of hose 13, is aligned with and disposed between two adjacent rows 26 in the manner shown, and the hose 13 may be either laid along the bed 25 between the same two rows or carried over the tops of the plants as may be convenient. When the flow of water through the nozzle is initiated, three divergently directed fan-like streams of water will be ejected therefrom in the manner illustrated, one forwardly of the nozzle for watering the area between the above-mentioned adjacent rows of plants and one over the tops of each of the rows for watering the areas to the outside of each of the rows. In accordance with the teachings of the invention the outlet openings 15—17 are such that the water streams ejected from the nozzle are fanned out whereby to cover a wide area of the bed 26. And by moving the nozzle in a longitudinal direction at a predetermined rate three rows of the bed may be watered. If desired, the nozzle may be oscillated from side to side as it is moved longitudinally whereby rows of greater width than the normal spread of the streams may be thoroughly watered.

The advantages of the invention should now be apparent. The nozzle attachment herein disclosed is simple in nature and readily and inexpensively constructed, yet is operative to effect the simultaneous watering of a plurality of rows of plants and in such a manner that there is little if any tendency for the soil around the plants to be displaced and/or for delicate plants to be damaged.

My design provides for the issuance from a single nozzle attachment of a plurality of divergently directed fan-like streams of water for simultaneously watering all or substantially all of the area between a plurality of rows of plants whereby upon mere longitudinal progression of the nozzle a complete and thorough saturation of a large area of a plant bed may be effected. It is to be noted, however, that while the area watered may comprise a plurality of rows of plants, the latter are not subject to damage during the watering operation since separate streams of water are directed on opposite sides of the rows and the streams are so directed that the water descends substantially vertically upon the areas to be watered.

Having thus described a preferred embodiment of my invention, what I claim as new and desire to secure by Letters Patent is:

A multiple-row plant watering nozzle comprising a horizontally elongated hollow body member having a front wall, side walls, top and bottom walls, and means at the rear end thereof for connection to a water supply hose or the like whereby said body member may be supplied with water; a pair of spaced vertical walls in said body member spanning the top and bottom walls thereof and converging inwardly from said side walls in the direction of said rear end to form therein three compartments to receive the water supplied; one of said compartments being in the front end portion of said body member; said front wall and each of said side walls rearwardly of the front portions of said vertical walls being provided with a horizontally elongated aperture positioned intermediate said top and bottom walls; and means forming an inclined surface extending from said bottom wall upwardly to the bottom edge of each of said apertures whereby the outward flow of water through said apertures will have an initial vertical component of movement.

References Cited in the file of this patent

UNITED STATES PATENTS

| Number | Name | Date |
|---|---|---|
| 173,784 | Hayes | Feb. 22, 1876 |
| 1,434,625 | Olsen | Nov. 7, 1922 |
| 1,780,168 | Burmeister | Nov. 4, 1930 |
| 2,224,450 | Scofield | Dec. 10, 1940 |
| 2,369,357 | Kunz | Feb. 13, 1945 |
| 2,494,067 | Snowden et al. | Jan. 10, 1950 |
| 2,530,808 | Cerasi | Nov. 21, 1950 |
| 2,598,961 | Andrus | June 3, 1952 |
| 2,631,869 | Ward | Mar. 17, 1953 |